United States Patent
Voss et al.

(10) Patent No.: US 12,263,702 B2
(45) Date of Patent: Apr. 1, 2025

(54) HEAVY TRUCK TIRE WITH SHOULDER RIB SIPE ARRANGEMENT

(71) Applicants: Compagnie Generale des Etablissements Michelin, Clermont-Ferrand (FR); Stefan Voss, Greer, SC (US); Robert Ciprian Radulescu, Greenville, SC (US)

(72) Inventors: Stefan Voss, Greer, SC (US); Robert Ciprian Radulescu, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 264 days.

(21) Appl. No.: 17/294,037

(22) PCT Filed: Nov. 11, 2019

(86) PCT No.: PCT/US2019/060708
§ 371 (c)(1),
(2) Date: May 14, 2021

(87) PCT Pub. No.: WO2020/102070
PCT Pub. Date: May 22, 2020

(65) Prior Publication Data
US 2022/0009291 A1    Jan. 13, 2022

Related U.S. Application Data

(60) Provisional application No. 62/768,505, filed on Nov. 16, 2018.

(51) Int. Cl.
*B60C 11/03*    (2006.01)
*B60C 11/12*    (2006.01)

(52) U.S. Cl.
CPC ...... *B60C 11/0302* (2013.01); *B60C 11/1218* (2013.01); *B60C 11/124* (2013.01);
(Continued)

(58) Field of Classification Search
CPC ....... B60C 2011/129; B60C 2011/1268; B60C 11/124; B60C 2011/039; B60C 11/005
See application file for complete search history.

(56) References Cited

U.S. PATENT DOCUMENTS 4,478,266 A * 10/1984 Pierson ................. B60C 11/005
152/209.5
4,836,257 A * 6/1989 Mamada ............... B60C 11/124
152/209.16

(Continued)

FOREIGN PATENT DOCUMENTS

CN      103180152 A    6/2013
CN      103958217 A    7/2014
(Continued)

OTHER PUBLICATIONS

JP-2013001325-A Machine Translation (Year: 2013).*
(Continued)

*Primary Examiner* — Justin R Fischer
*Assistant Examiner* — Wendy L Boss
(74) *Attorney, Agent, or Firm* — Neal P. Pierotti (57) ABSTRACT

The present invention provides for a heavy truck tire tread having a shoulder edge, shoulder groove, and shoulder rib therebetween. A plurality of sipes are in the shoulder rib and are oriented less than 20 degrees to the lateral direction. The sipes are spaced from one another between 5 to 18 millimeters in the longitudinal direction. Additionally or alternatively, the sipes are arranged so that a reference plane extends through a sipe bottom point and a sipe top point at the average sipe line. A sipe inclination line extends from the
(Continued)

sipe bottom point to the sipe top point, and a reference line extends through the sipe bottom point. A sipe inclination angle is defined by the reference line and the sipe inclination line and is greater than 0 degrees.

1 Claim, 10 Drawing Sheets (52) U.S. Cl.
CPC . *B60C 2011/1268* (2013.01); *B60C 2011/129* (2013.01); *B60C 2200/06* (2013.01)

(56) References Cited

U.S. PATENT DOCUMENTS

| | | | |
|---|---|---|---|
| 5,896,905 A | | 4/1999 | Lurois |
| 6,467,517 B1 | | 10/2002 | Rudulescu |
| 2003/0029535 A1 | | 2/2003 | Neugebauer et al. |
| 2010/0084062 A1* | | 4/2010 | Miyazaki ............... B60C 11/12 |
| | | | 152/209.18 |
| 2011/0265926 A1* | | 11/2011 | De Staercke ....... B60C 11/1236 |
| | | | 152/209.18 |
| 2016/0318351 A1* | | 11/2016 | Kidney ................ B60C 11/1272 |
| 2020/0262245 A1* | | 8/2020 | Mayni ................... B60C 11/124 |

FOREIGN PATENT DOCUMENTS

| | | | | |
|---|---|---|---|---|
| EP | 538723 A1 | * | 4/1993 | ........... B60C 1/0016 |
| EP | 2133217 A1 | * | 12/2009 | ............ B60C 11/12 |
| FR | 2564385 A1 | | 11/1985 | |
| GB | 2160829 A | | 1/1986 | |
| JP | 05330319 A | * | 12/1993 | ............... B60C 1/00 |
| JP | H09 58223 A | | 3/1997 | |
| JP | 2013001325 A | * | 1/2013 | ........... B60C 11/124 |
| WO | WO-2018102576 A1 | * | 6/2018 | ......... B60C 11/0302 |

OTHER PUBLICATIONS

JP-05330319 machine translation (Year: 1993).*
EP 2133217 machine translation (Year: 2009).*
International Search Report and Written Opinion dated Mar. 3, 2019.
European Patent Office, International Search Report dated Mar. 19, 2020, pp. 1-11 (included), European Patent Office, Rijswijk, The Netherlands.

* cited by examiner

HEAVY TRUCK TIRE WITH SHOULDER RIB SIPE ARRANGEMENT

CROSS-REFERENCE TO RELATED APPLICATIONS

The present application is a 35 U.S.C. § 371 application of PCT/US19/60708 filed on Nov. 11, 2019 and entitled "Heavy Truck Tire with Shoulder Rib Sipe Arrangement." PCT/US19/60708 claims priority to U.S. Provisional Patent Application No. 62/768,505 filed on Nov. 16, 2018. PCT/US19/60708 and U.S. Provisional Application No. 62/768,505 are incorporated by reference herein in their entireties for all purposes.

FIELD OF THE INVENTION

This invention relates generally to tire treads and tires. More specifically, this invention relates to tire treads and tires best suitable for the driven axles of heavy trucks that reduce aggression damage and irregular wear on the tires.

BACKGROUND OF THE INVENTION

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions. The design of tires often results in improvement and compromise between tire properties such as traction, rolling resistance and wear/abnormal wear.

It is known that adding sipes in a tire rib can improve wear rate and traction, but it has not been used successfully in the shoulder ribs of tires for long-haul trucking applications because it may trigger abnormal wear that can include irregular wear and aggression damage. The shoulders of long-haul tires are therefore typically designed with solid ribs, with no full-width transverse sipes or full-depth transverse grooves. As a result, the design of long-haul tire treads sacrifices shoulder rib wear rate and traction in order to avoid abnormal wear.

The incorporation of lateral sipes into a shoulder rib may provide the benefits of improved wet traction, improved traction aspect, and a better management of wear rates with other areas of the tread. Also, reduced hysteresis tread material may not be currently used in shoulders due to the fact that they are more sensitive to irregular wear and require a more robust tread design. As such, the incorporation of lateral sipes into a shoulder rib of a heavy truck tire may allow for variation and achievement of properties within the art of heavy truck tread design.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF PARTICULAR EMBODIMENTS

Reference will now be made in detail to embodiments of the invention, examples of which are illustrated in the drawings. These examples are provided by way of explanation of the invention.

Figure 1:
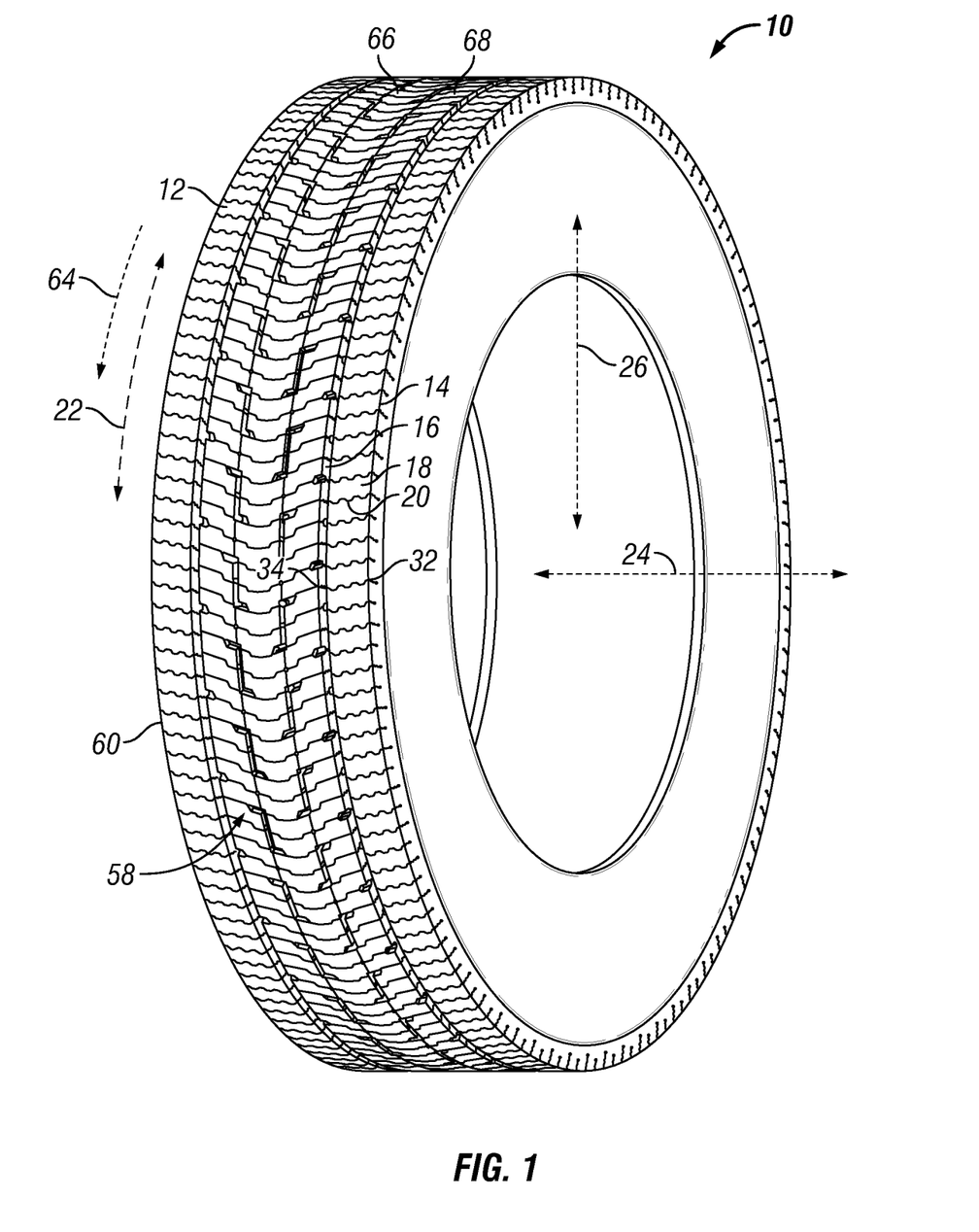
FIG. 1 is a perspective view of a heavy truck tire comprising an embodiment of the disclosed tire tread.

As shown in FIG. 1, a heavy truck tire 10 has a crown portion with tread 12 connected by respective sidewalls to beads portions of the tire 10. The tread 12 shown in FIG. 1 comprises a tread 12 according to an embodiment of the invention. The design of the tread 12 is substantially symmetric, that is to say that the tread features are arranged substantially symmetrically about the center plane of the tread 12. This tread 12 is said to be of a directional design because it has a different appearance according to which side it is oriented. A directional tire 10 or tread 12 does not only look differently but it also performs differently if used in one rolling direction 64 or the other. This is why directional treads 12 or tires 10 conventionally bear markings that indicate the designed rolling direction 64. Such markings may take the form of arrows pointing in the designed rolling direction. Using the tire 10 for rolling in the opposite direction would be detrimental to its best performance. However, it is to be understood that the tire 10 and tread 12 as provided herein are not limited to being directional and that embodiments that are not directional are possible.

FIG. 1 shows various directions of the tire 10 and tread 12 such as the longitudinal direction 22, also referred to as the circumferential direction of the tire, which can be the forward or rearward direction of rolling of the tire 10. The rolling direction 64 is the forward direction of travel in the longitudinal direction 22. A lateral direction 24, also referred to as the axial or transverse direction, is parallel to a central axis of the tire 10 about which the tire 10 rotates. The lateral direction 24 may be perpendicular to the longitudinal direction 22. A thickness direction 26, which may also be referred to as the tread depth direction or radial direction is identified. The thickness direction 26 can be the thickness of the tread 12 when the tread 12 is provided as a retread band and is flat.

The thickness direction 26 is radial and thus is in multiple directions 360 degrees about the central axis which extends in the lateral direction 24. The thickness direction 26 shown in FIG. 1 is but one location of the thickness direction 24 and it is to be understood that others extending through other areas of the tread 12 perpendicular to the central axis are also present. The tread 12 depth is generally defined as the distance between the tread contact surface and a translation of this contact surface to be tangent to the deepest features in the tread 12. The tread 12 has an outer surface 58 that extends 360 degrees about the central axis and that engages the ground 62 when rolling.

The tread 12 has a rolling tread width in the lateral direction 24 that extends from a shoulder edge 14 on one side of the tread 12 to a shoulder edge 60 on an opposite side of the tread 12. The shoulder edges 14, 60 are generally straight, but if notches are present in at these locations, then the shoulder edges 14, 60 could extend in the lateral direction 24 at these points to define shoulder edges 14, 60 that are not completely oriented only in the longitudinal direction 22. The tread 12 has several longitudinal grooves that extend 360 degrees completely around the entire tire 10 in the longitudinal direction 22. One of the longitudinal grooves is identified as shoulder groove 16 which is the longitudinal groove closest to the shoulder edge 14 in the lateral direction 24. A shoulder rib 18 is defined between the shoulder groove 16 and the shoulder edge 14. The shoulder groove 16 is an open groove in that it is generally open with its bottom visible when looking at the outer surface 58. The tread 12 includes additional ribs such as a center rib 66 which is at the center of the tread 12 in the lateral direction 24. An intermediate rib 68 is between the center rib 66 and the shoulder rib 18. A partially hidden groove is between the intermediate rib 68 and the center rib 66 and upon wear of the tread 12 through normal use can become more open or fully open depending upon the cross-sectional design of the partially hidden groove. It is to be understood that in other embodiments any one or combination of open, hidden, or partially hidden longitudinal grooves can be employed. The other side of the tread 12 in the lateral direction 24 may be symmetrical and include the same features as previously discussed. The other side has an intermediate rib, a shoulder rib with the shoulder edge 60, an open shoulder groove, and a partially hidden center/intermediate groove. Although shown as incorporating a pair of intermediate ribs, no intermediate ribs can be present in other embodiments of the tread 12.

Figure 2:
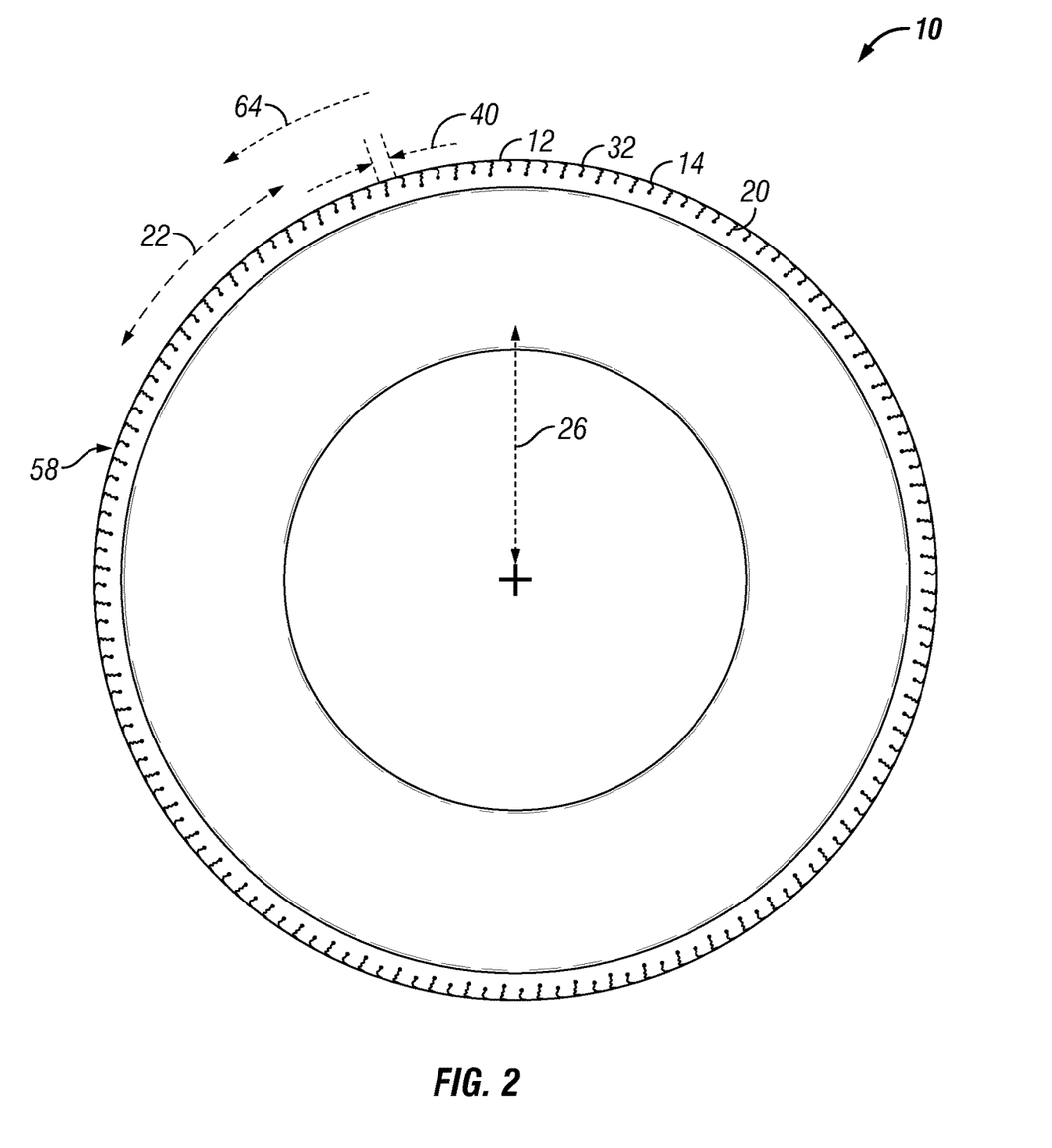
FIG. 2 is a right side view of the tire of FIG. 1.

The longitudinal grooves such as the partially hidden grooves and the shoulder groove 16 can have a width of over two millimeters. Sipes 20 are present in the tread 12 and extend from the outer surface 58 into tread 12 some amount in the thickness direction 26. The sipes 20 are narrower than the grooves in width and may have a width that is two millimeters or less. The sipes 20 are present in the shoulder rib 18, but they could be located in other ribs of the tread 12 as well. The sipes 20 in the shoulder rib 18 extend across the entire width of the shoulder rib 18 such that the sipes 20 engage the shoulder groove 16 and the shoulder edge 14. A side view of the tire 10 is shown in FIG. 2 and it can be seen that the sipes 20 extend 360 degrees around the entire length of the tire 10 in the longitudinal direction 22. The sipes 20 extend different distances into the tread 12 from the outer surface 58 in the thickness direction 26 as shown, and the sipes 20 repeat in a pattern so that immediately successive sipes 20 to one of the sipes 20 have a different depth. The pattern is arranged so that one sipe 20 extends less of a distance into the tread 12, the next successive sipe extends more of a distance, the next successive sipe extends less of a distance into the tread 12, and so forth all the way around the tire 10.

Figure 3:
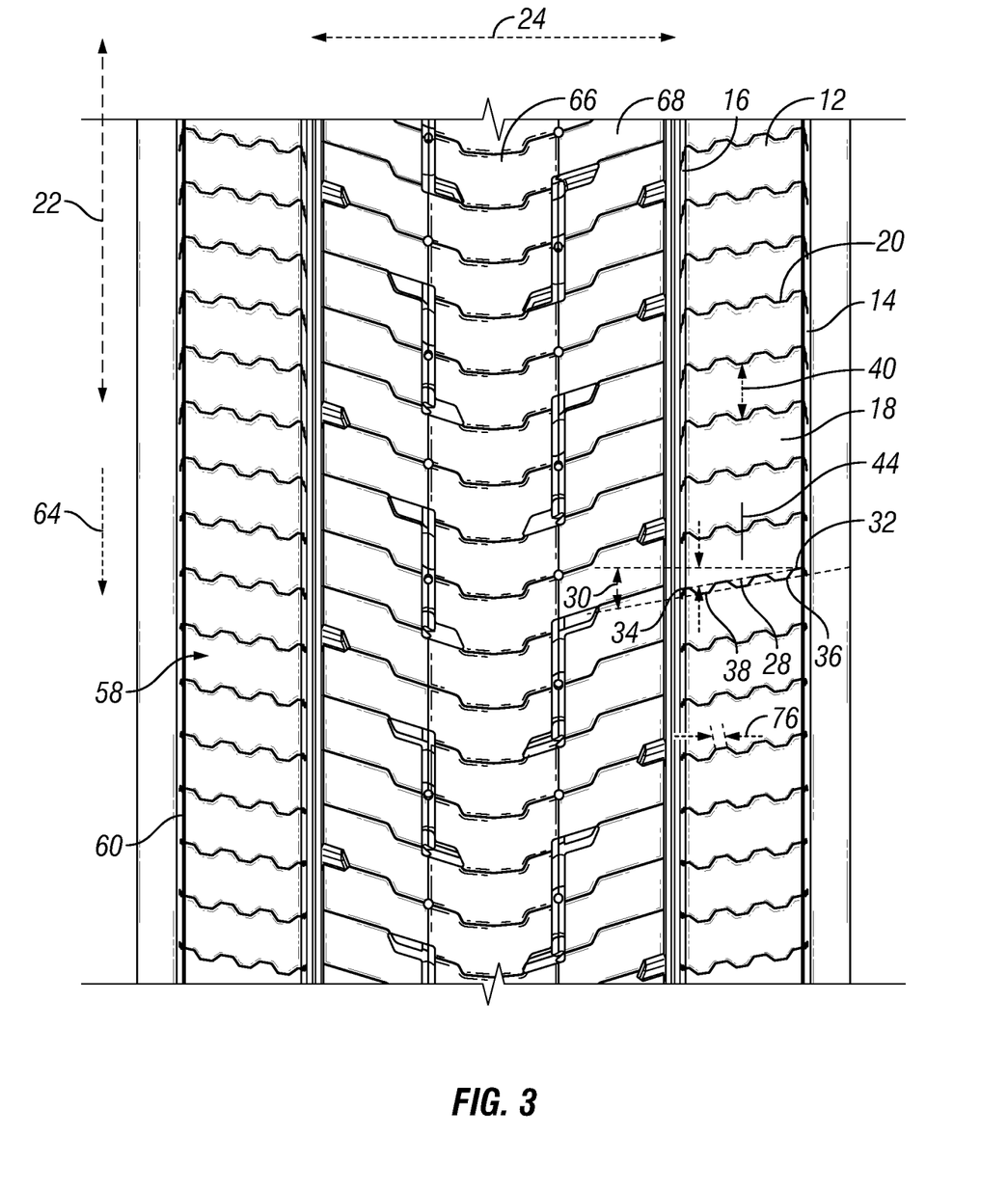
FIG. 3 is a front view of the tread of FIG. 1.

FIG. 3 is a close up view of the tread 12 of FIG. 1 in a flat layout and could be the tire 10 flattened out, or a tread band that is flat. The sipes 20 are narrow space formed in the tread 12 between walls of material over a depth at most equal to the tread depth, said walls being able, at least in part, to come into contact with one another in the usual running conditions of the tire. The sipes 20 are full depth sipes. Sipes 20 are said to be full depth sipes when their average depth is at least 50% of the tread 12 depth. In some versions of the tread 12 a mixture of sipes 20 can be present that do not extend to at least 50% of the tread 12 depth, and that do extend to at least 50% of the tread 12 depth. The sipes 20 are oriented to extend in the lateral direction 24 or to be angled relative to the lateral direction 24 but not at that much of an angle to the lateral direction 24.

The sipe 20 need not extend completely in a linear direction from the shoulder edge 14 to the shoulder groove 16. As shown in FIG. 3 the sipes 20 have a wave like extension in the lateral direction 24 and may be referred to as castle-type sipes 20. Since the sipes 20 may not extend completely in a linear direction, to determine their angle to the lateral direction 24 an average sipe line 28 is defined at two different locations on each particular sipe 20. The first average sipe line 28 is the line drawn from the intersection point 32 to intersection point 34. Intersection point 32 is the point of engagement of the sipe 20 with the shoulder edge 14. Intersection point 34 is the point of engagement of the sipe 20 with the shoulder groove 16. Through intersection point 32 a line completely in the lateral direction 24 is drawn, and the average sipe line angle 30 is the angle of the first average sipe line 28 to this line.

As the ends of some sipe 20 designs may depart radically from the general extension of the sipe 20 through the rest of its length, a second average sipe line 28 may also be defined with the same sipe 20 as the first average sipe line 28 is so defined. This radical departure may be in designs where the sipe 20 is oriented in the lateral direction 24 along practically its whole length but right before the engagement point with the shoulder groove 16 extends a good distance in the longitudinal direction 22 before engaging the shoulder groove 16. An average sipe line 28 using this engagement point will result in a large average sipe line angle 30 that would otherwise indicate the generally lateral sipe 20 is instead heavily angled relative to the lateral direction 24. This second average sipe line 28 is defined by measuring inboard in the lateral direction 24 eight millimeters from the shoulder edge 14 and placing point 36 at the sipe 20 at this location in the lateral direction 24. Next, one may measure eight millimeters outboard from the shoulder groove 26 and denote point 38 at the sipe 20 at this location. The second average sipe line 28 is drawn from point 36 to point 38, and a line completely in the lateral direction 24 extends through the point 36 and the average sipe line angle 30 is measured between the second average sipe line 28 and this line. Due to the size constraints of FIG. 3, the lateral line and the average sipe line angle 30 associated with the second average sipe line 28 are not illustrated. Additional description of the first and second average sipe lines 28 is described below with reference to FIG. 11.

The sipe 20 can be described as a lateral sipe if either one of the average sipe line angles 30 as calculated above is less than 20 degrees. As an example, if the average sipe line angle 30 using the first average sipe line 28 is 10 degrees, and the average sipe line angle 30 using the second average sipe line 28 is 30 degrees, then the sipe 20 is still a lateral sipe. If both average sipe lines 28 are 20 degrees or above then the sipe 20 can be described as angled instead of generally laterally oriented. The tread 12 claimed herein includes sipes 20 that are lateral in the shoulder rib 18. All of the sipes 20 of the shoulder rib 18 may by lateral sipes, and none of the sipes 20 of the shoulder rib 18 are angled. However, in other embodiments, some of the sipes 20 in the shoulder rib 18 are lateral sipes and some are angled sipes.

Figure 4:
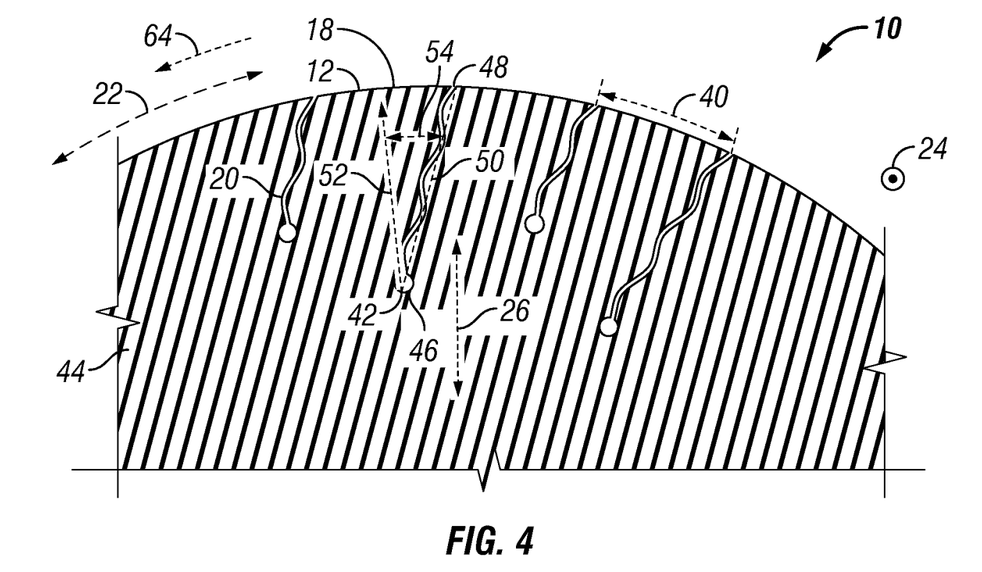
FIG. 4 is a detailed cross-sectional view taken from a plane cut in the longitudinal direction of a portion of the tire of FIG. 1.

The tread 12 therefore has a plurality of lateral sipes 20 in the shoulder rib 18. These lateral sipes 20 can have one of two features in accordance with certain embodiments, and in some embodiments may have both of these two features. The first of the two features is angularity of the lateral sipes 20 relative to the thickness direction 26. A portion of the tread 12 in cross-section through a reference plane 44 parallel to the longitudinal direction 22 is shown in FIG. 4. The sipes 20 have two different depths, one longer and one shorter, into the tread 12 in the thickness direction 26 and these two different depths alternate with one another about the entire circumference of the tire 10. All of the sipes 20 of the tread 12 are not arranged completely in the radial/thickness direction 26 but instead are angled thereto. This angle may be a negative inclination in that the sipes 50 are angled relative to the rolling direction 64 such that the sipe bottom 42 enters the contact patch 56 before the sipe 20 at the outer surface 58.

The angularity of the sipe 20 in the thickness direction 26 may be described with reference to FIG. 5 that shows a cross-sectional view through the shoulder rib 18 in a reference plane 44 oriented in the longitudinal direction 22. The sipe 20 in this view has a negative inclination angle. The sipe 20 is straight in shape and has a constant cross-sectional shape and extends down into the tread 12 at an angle to the thickness, radial direction 26. A sipe top point 48 is present at the top of the sipe 20 at the outer surface 58. The sipe 20 extends into the tread 12 until it terminates at a sipe bottom 42 which is the location farthest from the opening at the sipe top point 48. A sipe bottom point 46 is noted at a location at the sipe bottom 42. A sipe inclination line 50 extends from the sipe bottom point 46 to the sipe top point 48. The bottom of the sipe 20 features a teardrop, but this feature is optional in other embodiments. The teardrop can be sized so that its average diameter is greater than the width of the sipe 20 that is outside of its teardrop portion. The teardrop can be provided in various cross-sectional shapes, and can have a cross-sectional width that is 4 millimeters. In other embodiments the teardrop has a cross-sectional width that is greater than 2 millimeters.

A reference line 52 extends through the sipe bottom point 46 and through the outer surface 58. The reference line 52 is oriented completely in the radial direction 26 and does not have a component in the longitudinal/circumferential direction 22 or the lateral/axial direction 24. The inclination of the sipe 20 is observed upon comparison of the orientation of the sipe inclination line 50 to the reference line 52. The sipe inclination line 50 is oriented at a sipe inclination angle 54 to the reference line 52. The sipe inclination angle 54 may be any magnitude greater than 0 degrees. The sipe inclination angle 54 may from 1 degree to 5 degrees, from 5 degrees to 10 degrees, or none zero to up to 10 degrees. The sipe inclination angle 54 in other embodiments may be from 10 degrees to 45 degrees, from 11 degrees to 45 degrees, from 10 degrees to 20 degrees, from 11 degrees to 20 degrees, from 10 degrees to 15 degrees, from 13 degrees to 23 degrees, from 15 degrees to 28 degrees, from 15 degrees to 30 degrees, from 18 degrees to 28 degrees, from 20 degrees to 25 degrees, from 20 degrees to 45 degrees, or from 12 degrees to 23 degrees in accordance with various exemplary embodiments.

The inclination of the sipe inclination line 50 to the reference line 52 is negative in direction in that it is against the rolling direction 64 of the tread 12. In this regard, the sipe bottom point 46 is configured to enter the contact patch 56 of the tread 12 as it engages the ground 62 before the sipe top point 48. The reference line 52, the sipe bottom point 46, the sipe inclination line 50, the sipe top point 48, and the sipe inclination angle 54 all fall within a reference plane 44. The cross-section in FIG. 6 likewise falls within the reference plane 44 so all of these elements can be viewed in relation to one another. FIG. 3 shows the orientation of the reference plane 44 relative to the rest of the tread 12. As shown, the reference plane 44 is oriented in the longitudinal/circumferential direction 22 such that the longitudinal/circumferential direction 22, and the rolling direction 64, lies within the reference plane 44. The lateral/axial direction 24 is perpendicular to the reference plane 44.

Figure 5:
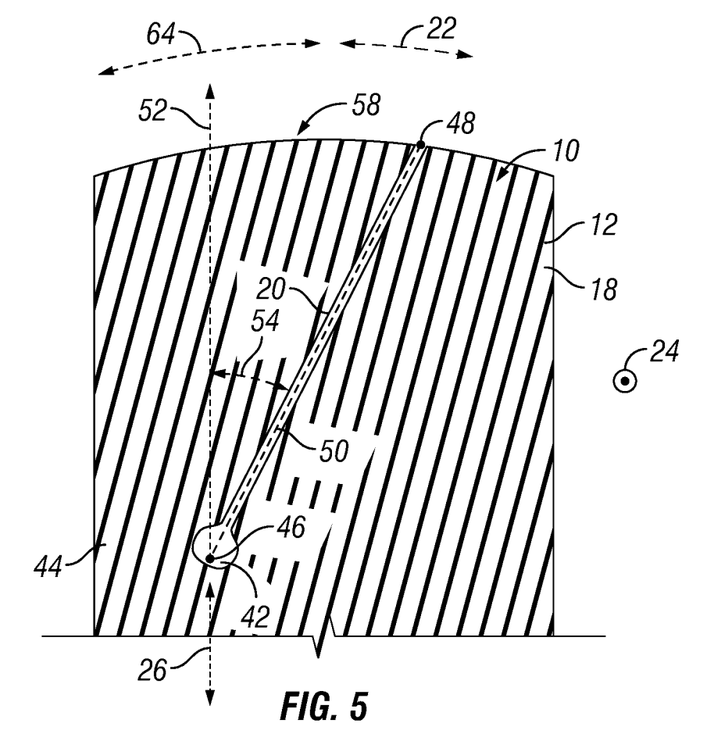
FIG. 5 is a cross-sectional view of a portion of a tread that includes a sipe oriented at a non-zero angle to the thickness direction.
Figure 6:
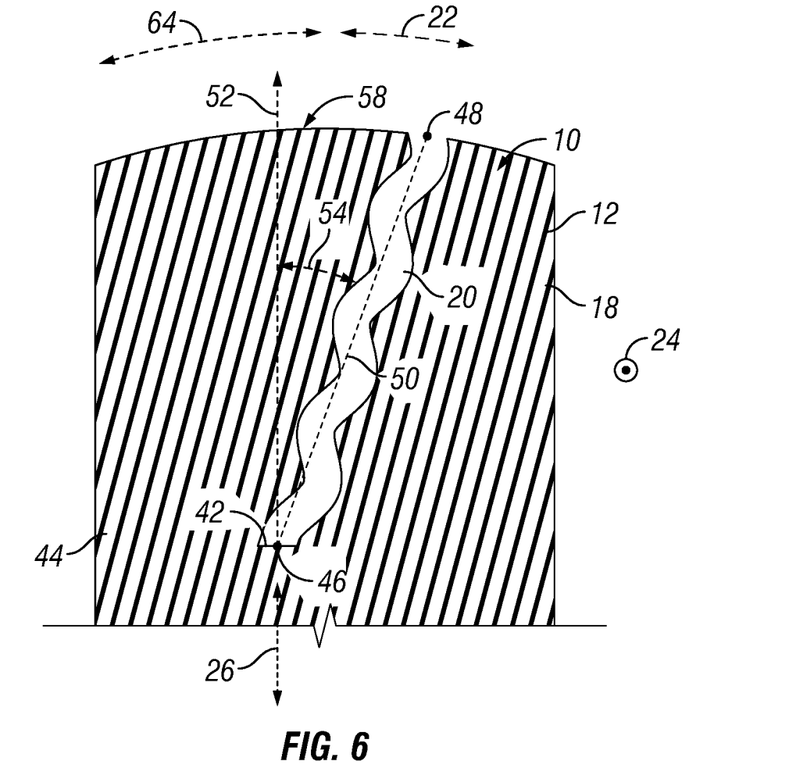
FIG. 6 is a cross-sectional view of a portion of a tread that includes a sipe that undulates that is oriented at a non-zero angle to the thickness direction.

FIG. 6 is a view similar to that of FIG. 5 but with a sipe 20 that instead of having a straight extension from the sipe bottom point 42 to the sipe top point 48 has instead an undulation between these points 42, 48. The sipe inclination line 50 is inclined at the sipe inclination angle 54 relative to the reference line 52. The points 46 and 48, and lines 50 and 52 and angle 54 are defined in the same way as previously discussed. As shown, the sipe 20 inclination line 50 is not present within the sipe 20 at certain locations due to the undulations.

Figure 7:
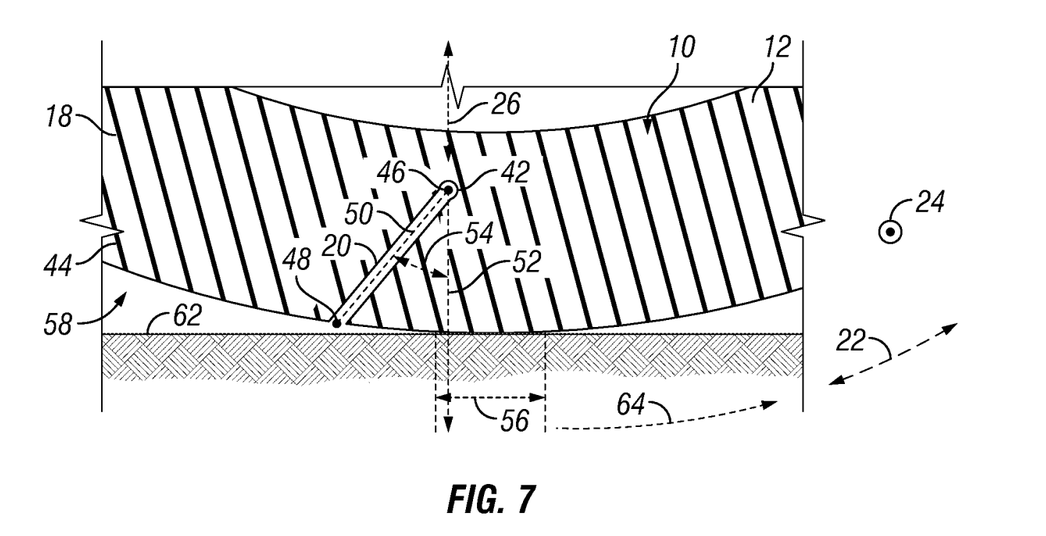
FIG. 7 is a cross-sectional view of a portion of a tread that includes a sipe that is within and approaching contact with the ground.

Another cross-sectional view is shown in FIG. 7 which is a cross-section taken along reference plane 44 but with the addition of the ground 62 into the figure and with the tread 12 being part of a tire 10. The reference plane 44 is again oriented relative to the rolling direction 64 and the longitudinal/circumferential direction 22 such that they lie within the reference plane 44. The inclination components of the sipe 20 such as the sipe bottom point 46, the sipe top point 48, the sipe inclination line 50, the reference line 52, and the sipe inclination angle 54 are located within the shoulder rib 18 and can be arranged as described above and a repeat of this information is not necessary. The tire 10 is rolled in the rolling direction 64 so that a portion of the tread 12 has entered the contact patch 56 upon contact with the ground 62. The vehicle travel direction 82 is also shown in FIG. 7 and is the direction the tire 10 and vehicle travels relative to the ground 62. The direction of inclination of the sipe 20 is shown in that the sipe bottom point 46 enters the contact patch 56 first before the sipe top point 48. The sipe bottom point 46 may be said to enter the contact patch first because a line drawn from the sipe bottom point 46 outward in the thickness direction 26 towards the outer surface 58 (along reference line 52 in FIG. 7) is in the contact patch 56 while the sipe top point 48 is not yet in the contact patch in FIG. 7. In this regard, the sipe 20 is said to be oriented at a "negative" sipe angle in that it is oriented away from the direction of travel of the tread 12 upon forward motion. If the truck were to be put into reverse, of course the opposite configuration would result in which the sipe top point 48 would first enter the contact patch 56 followed by the sipe bottom point 46. Upon forward motion of the tread 12, the sipe bottom point 46 will exit the contact patch 56 first before the sipe top point 48. The reference plane 44 can be at different locations in the lateral direction 24, in some instances being at the midpoint of the shoulder rib 18 in the lateral direction 24, and in other instances not being at the midpoint.

Figure 8:
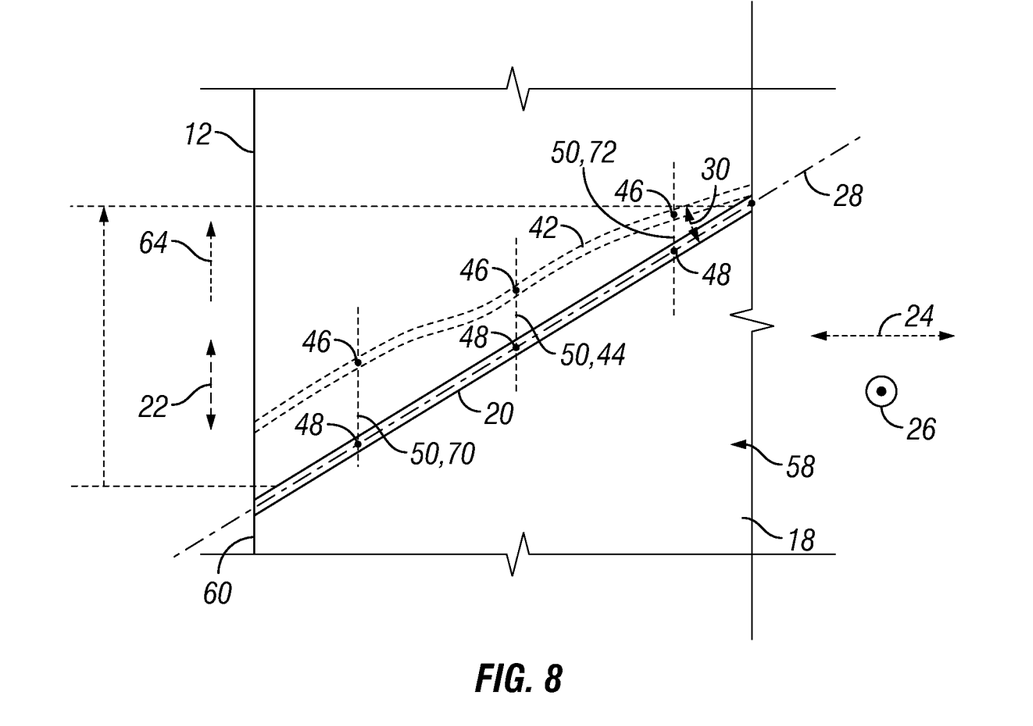
FIG. 8 is a front view of a portion of the tread with a sipe with a bottom portion not uniform across its entire length.
Figure 9:
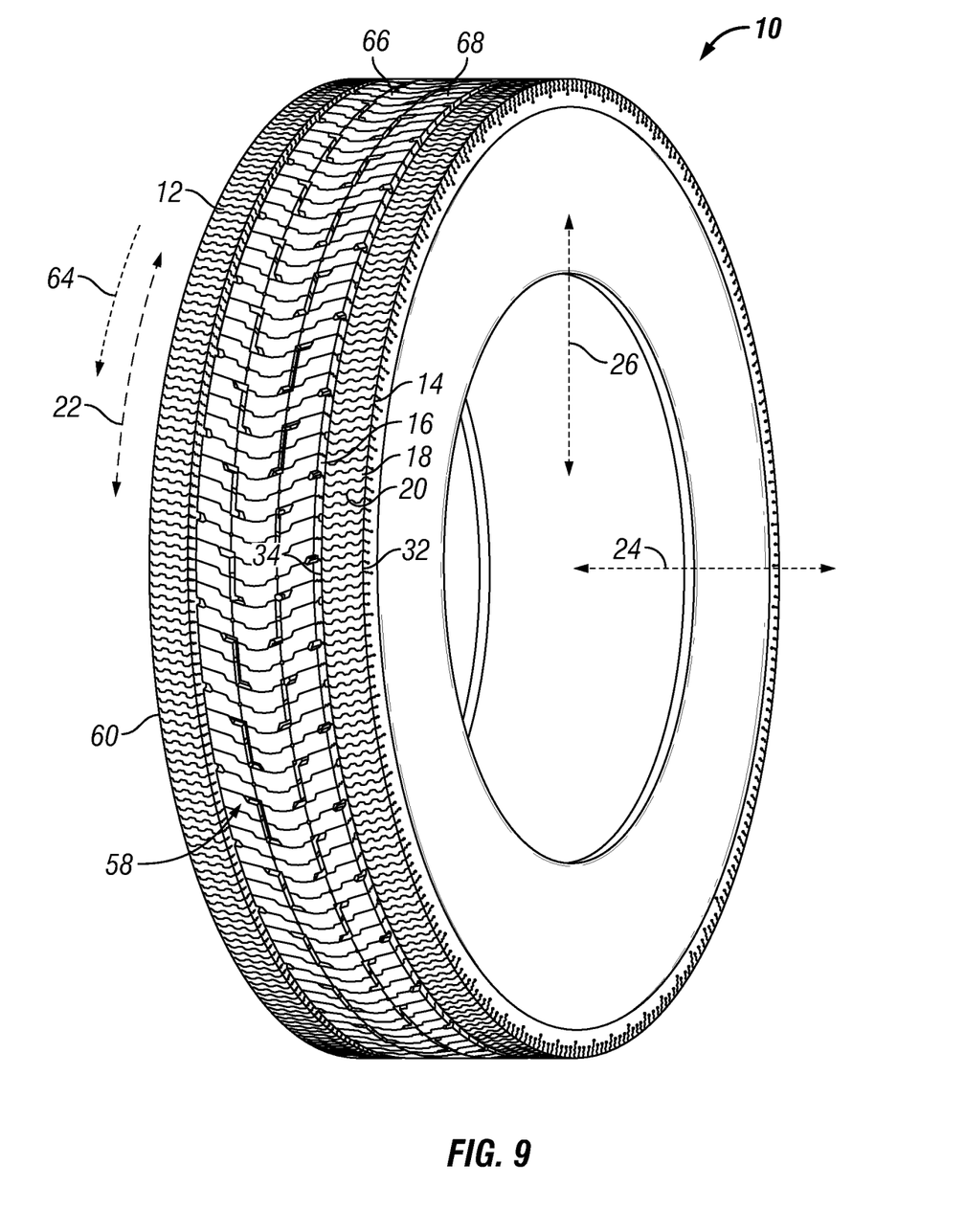
FIG. 9 is a perspective view of a heavy truck tire comprising another embodiment of the disclosed tread.

In some instances, the sipe inclination angle 54 is not the same along the entire length of the sipe 20 from the shoulder edge 14 to the shoulder groove 16. FIG. 8 shows a portion of the tread 12 in which the sipe 20 extends into the tread 12 from the outer surface 58 at different angular orientations so that a constant sipe inclination angle 54 is not present across the entire sipe 20 in the shoulder rib 18. As shown, on the left hand side of FIG. 8 sipe top and bottom points 48, 46 are noted with counterpart reference plane 70 and sipe inclination line 50. The sipe inclination angle 54 can be calculated at this location as previously discussed. The shoulder rib 18 has additional points 48, 46 linked with another reference plane 44 and sipe inclination line 50. The sipe inclination angle 54 is different at this location than at the location on the left hand side associated with reference plane 70. Still further, the sipe 20 changes at the right hand side such that the right hand location points 48, 46 with associated reference plane 72 and sipe line 50 has yet a different sipe inclination angle 54. In instances where the sipe inclination angle 54 is not constant in the shoulder rib 18, the sipe inclination angle 54 of the sipe 20 is determined by obtaining an average of the sipe inclination angle 54 at five equally spaced points along the sipe 20. As an example, the sipe inclination angle 54 can be measured at five different equally spaced locations along its length between its length in the lateral direction 24 to yield values of 10 degrees, 8 degrees, 15 degrees, 5 degrees, and 7 degrees for sipe inclination angle 54 of degrees ((10+8+15+5+7)/5=9). As such, should the sipe 20 have different sipe inclination angles 54, an average of these values can be obtained in order to determine the sipe inclination angle of that specific sipe 20.

As previously stated, the sipes 20 can have one of two features and the first of these is the angularity of the sipes 20 relative to the thickness direction 26 as described. The second one of the two features that the sipes 20 of the present disclosure can have is a spacing in the longitudinal direction 22 between successive sipes 20 that is 5 to 18 millimeters. In some instances, the spacing is 10 millimeters. In other embodiments, the spacing is from 5-7 millimeters, from 7-11 millimeters, from 11-15 millimeters, from 15-18 millimeters, from 5-10 millimeters, from 10-18 millimeters, or from 8-13 millimeters. FIGS. 9-12 illustrate another exemplary embodiment of the tread 12 in which the sipes 20 are not angled relative to the thickness direction 26, instead having a sipe inclination angle 54 of 0 degrees, but do have a spacing 40 that is smaller than that of the FIG. 1 embodiment and is in the range of 5 to 18 millimeters.

The sipes 20 are oriented in the lateral direction as defined above. As shown with reference to FIG. 11, the sipes 20 have a castle-type shape and they extend from the shoulder edge 14 to the shoulder groove 16. For purposes of clarity, the average sipe line 28 is drawn on two different sipes 20 and the first one extends from the intersection point 32 at the shoulder edge 14 to the intersection point 34 at the shoulder groove 16. The average sipe line angle 30 is calculated relative to the lateral direction line drawn through intersection point 32 and this angle 30 is less than 20 degrees. The average sipe line 28 is drawn as shown on a sipe 20 three sipes 20 rearward in the rolling direction 64. Point 36 is located 8 millimeters inboard in the lateral direction 24 from the shoulder edge 14 at sipe 20, and point 38 is located 8 millimeters outboard in the lateral direction 24 from shoulder groove 16 at the sipe 20, and the average sipe line 28 is shown as extending through points 36 and 38. A line is drawn through point 36 in the lateral direction 24 and the average sipe line angle 30 is measured and is less than 20 degrees. As discussed, only one of the average sipe line angles 30 as measured by the above two techniques need be less than 20 degrees for the sipe 20 to qualify as a laterally oriented sipe 20 as per the present disclosure.

Figure 11:
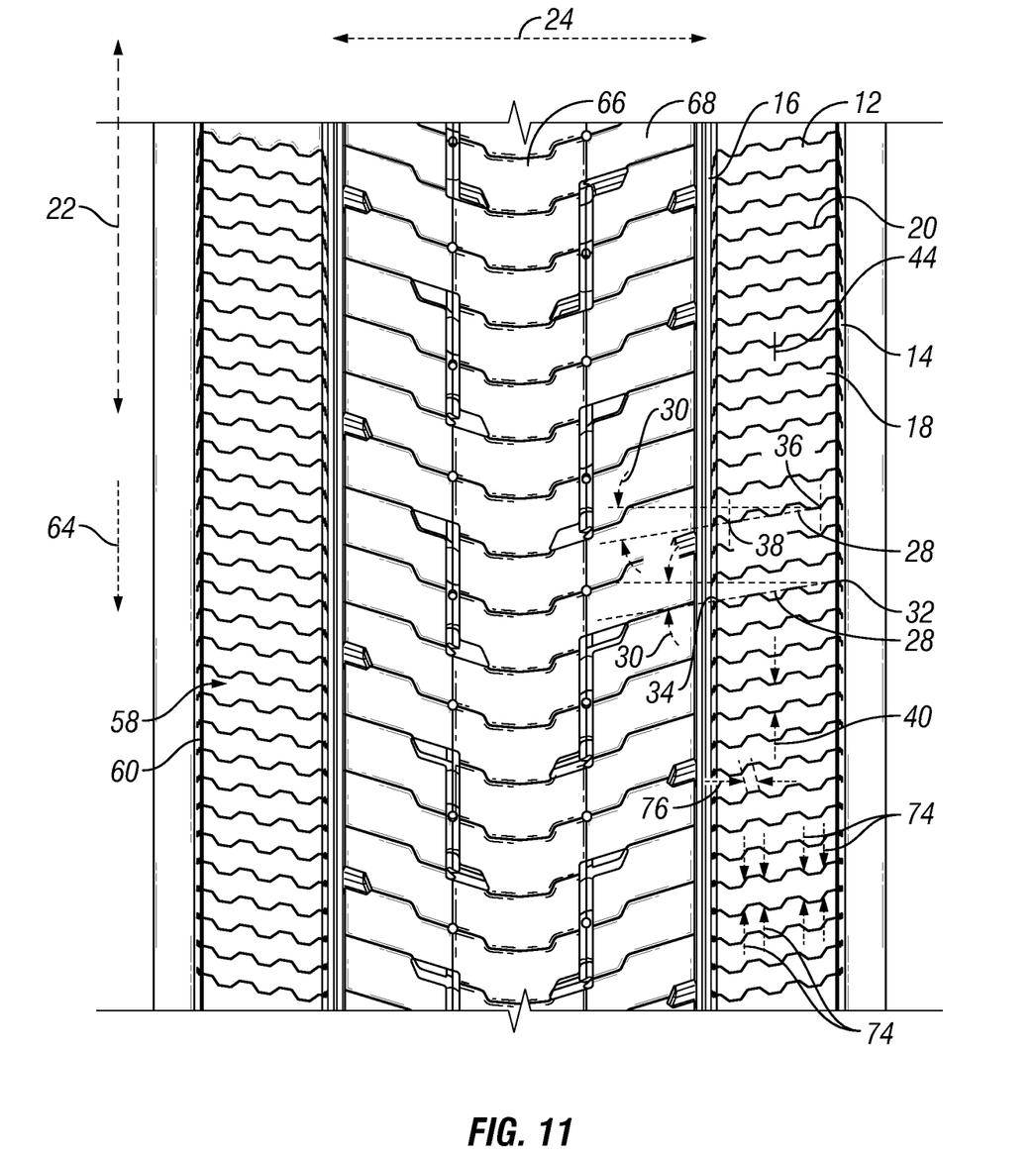
FIG. 11 is a front view of the tread of FIG. 9.

The spacing 40 of successive sipes 20 in the longitudinal direction 22 is also illustrated in FIG. 11. In this regard, the spacing 40 may be constant from one sipe 20 to the next successive sipe 20 so that the sipes 20 are identical in shape to one another and simply spaced from one another in the longitudinal direction 22 the amount of spacing 40. The spacing can be measured at any lateral location of the sipe 20 and various spacing 74 measurements are shown at different points in the lateral direction 24. The successive sipes 20 can be arranged so that all spacing 74 located at all locations in the lateral direction 24 are spaced from 5-18 millimeters from one another and are all the same value as one another. If some of the sipes 20 are not symmetric but instead result in successive sipes 20 with some spacing 74 outside of the 5-18 millimeter range, then if there are at least two successive sipes 20 within the shoulder rib 18 that do still include spacing 74 along their entire lengths that is from 5-18 millimeters then such tread 12 falls within the second feature as defined herein. The spacing 40, 74 can be measured at the outer surface 58.

FIG. 11 shows the sipes 20 being castle-type in shape when viewed on the outer surface 58. The undulations can be zig-zagging, a single S-shape, a dog-leg shape, a square U-shaped configuration, an arc, or otherwise in alternate embodiments. Undulated sipes 20 promote tread 12 stiffness due to the sipe walls interlocking when loaded on the ground 62. Undulations may have many different shapes and can typically be one-directional or bi-directional, and the shapes (such as the zig-zags) can be along some or all of the entire depth of the sipe 20 in the thickness 26 and longitudinal 22 directions. FIG. 11 also illustrates the fact that the local sipe angle may vary to a large extent while the average sipe line angle 30 is maintained less than 20 degrees. The castle-type sipes 20 may be arranged to achieve a higher level of lateral blocking as opposed to egg-crate style sipe interlocking. The lateral step 76 size of the sipes 20 may be 4.5 to 5.5 millimeters in some embodiments. An egg-crate style sipe 20 has a sinusoidal shape on the outer surface 58 and also a sinusoidal shape extending into the tread 12 in the thickness direction 26. The castle-type sipes 20 also have a sinusoidal shape extending into the tread 12 in the thickness direction 26. Other sipe 20 shapes are possible such as one that has an egg-crate/sinusoidal shape at the outer surface 58 but a straight shape upon extension into the tread 12 in the thickness direction 26, and ones that has a linear shape at the outer surface 58 but a sinusoidal shape in the thickness direction 26.

Figure 10:
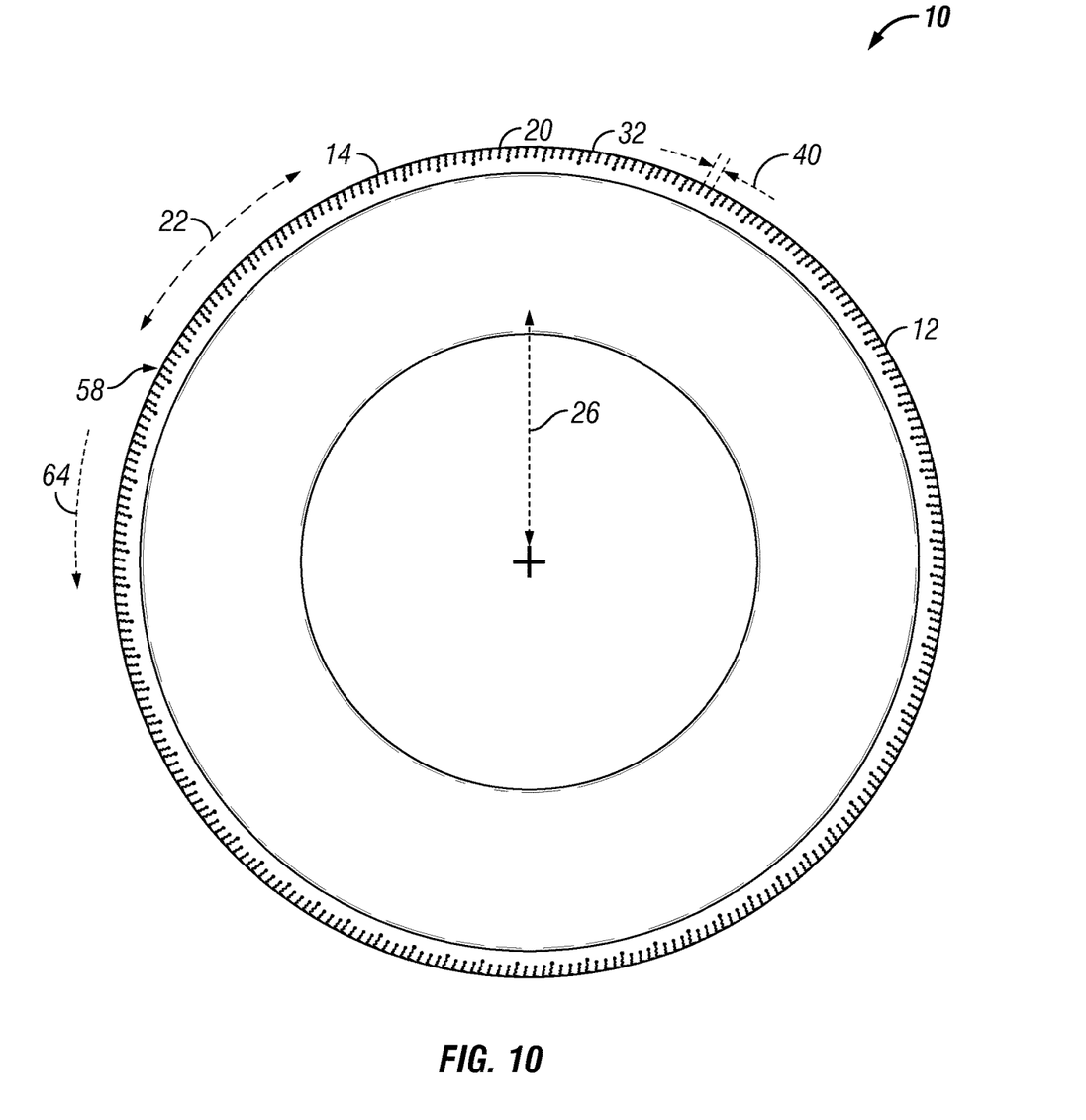
FIG. 10 is a right side view of the tire of FIG. 9.
Figure 12:
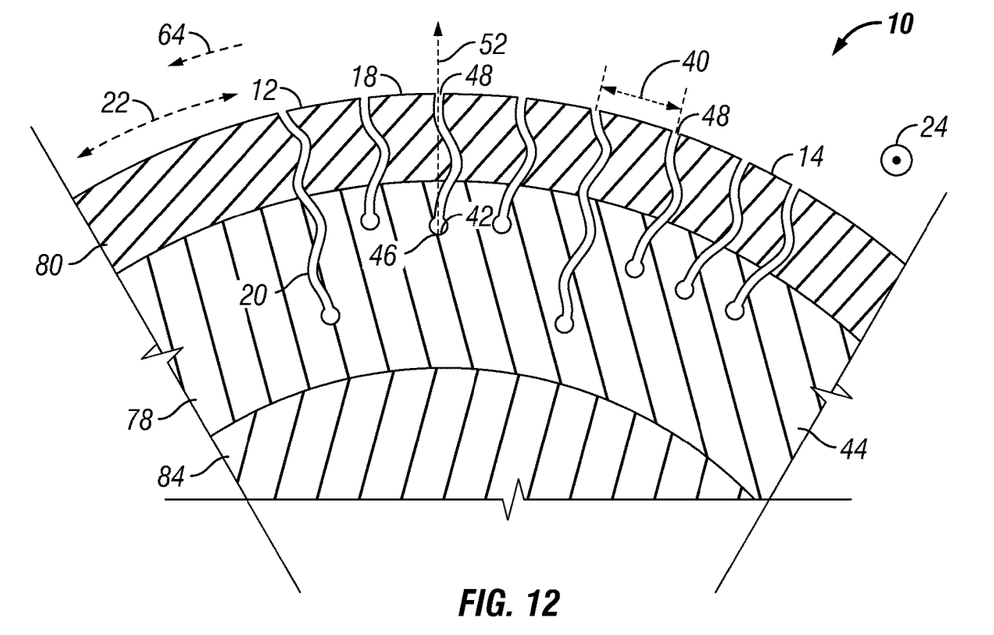
FIG. 12 is a cross-sectional view taken through a plane in the longitudinal direction of a portion of the tread of FIG. 9.

As shown in FIG. 10, the sipes 20 can extend completely around the entire circumference of the tire 10 in the longitudinal direction 22 and form a repeating pattern at the edge, and as shown in FIG. 12 within a cross-sectional view taken along reference plane 44. With reference to FIG. 12, the sipes 20 are not angled to the thickness direction 26 but all extend from the outer surface 58 to the central axis of the tire and thus in the radial/thickness direction 26. The depths of the sipes 20 are different in that some advance farther into the tread 12 than others. As shown, three successive sipes 20 extend the same amount into the thickness direction 26 followed by a sipe 20 that extends a longer amount than these successive three sipes 20. This pattern can repeat the entire circumferential distance of the tire 10. In accordance with various exemplary embodiments, the sipes 20 that extend for less of a distance into the tread 12 than the other sipes 20 may extend up to 70% the distance into the tread as do the longer extending sipes 20 in the thickness direction 26. In some specific embodiments, the shorter extension sipes 20 extend up to 60% of the distance into the tread 12 in the thickness direction 26 of the longer extension sipes 20. All of the sipes 20 of this embodiment are arranged at the spacing amount 40 that is from 5-18 millimeters. In other embodiments, the spacing amount 40 can be different between some of the success sipes 20 but still be within the 5-18 millimeter range. In other embodiments, only some of the successive sipes 20 are within the 5-18 millimeter range, and other successive sipes 20 in the shoulder rib 18 are outside of this range.

The use of smaller spacing 40 causes more narrow "columns" to be formed between successive sipes 20. Forces on this column may cause the column to flex at its base in some instances leading to cracking in the column, although this may not be the case in every design of the tread 12. One way to counter this potential wearing on the tread 12 is to use two different materials within the tread 12. A first material layer 78 can be present at the bases of the columns which would correspond to a position at the sipe bottom points 46 and closer to the center of the tire 10 in the thickness direction 26 than a second material layer 80 that could extend from the first material layer 78 to the outer surface 58. The first material layer 78 may be stronger than the second material layer 80 so that cracking at the base of the column is minimized or prevented. The first material layer 78 may be compromised in that its rolling resistance performance is not as good as that of the second material layer 80. Other combinations of material usage in the tread 12 at different thickness locations of the sipes 20 are also possible. In most designs, the compound nearest to the belts has a lower rolling resistance than the tread 12 closest to the ground 62. The compound closer to the ground 62 is usually designed to be better for wear performance or aggression performance, but as a result has a higher hysteresis. In this case the situation may be reversed—for a lower rolling resistance tire 10, we would normally use a low hysteresis undertread, however, in the shoulder rib 18 we would incorporate a layer of aggression performance mix located within the vicinity of the bottom of the sipes 20. Such a layer could be sandwiched between the usual tread layer 80, and a third layer consisting of the normal low hysteresis undertread compound. This would minimize the negative impact on rolling resistance of the aggression performant layer. In FIG. 12, a third material layer 84 under the first material layer 78 may be different than the first material layer 78 and may be the same as or different than the second material layer 80. The thickness of the first material layer 78 may be varied so that it does not include the shallower sipes 20 but does have the deeper sipes 20 located therein, where the shallower sipes 20 are instead completely located within the second material layer 80 in various embodiments.

Figure 13:
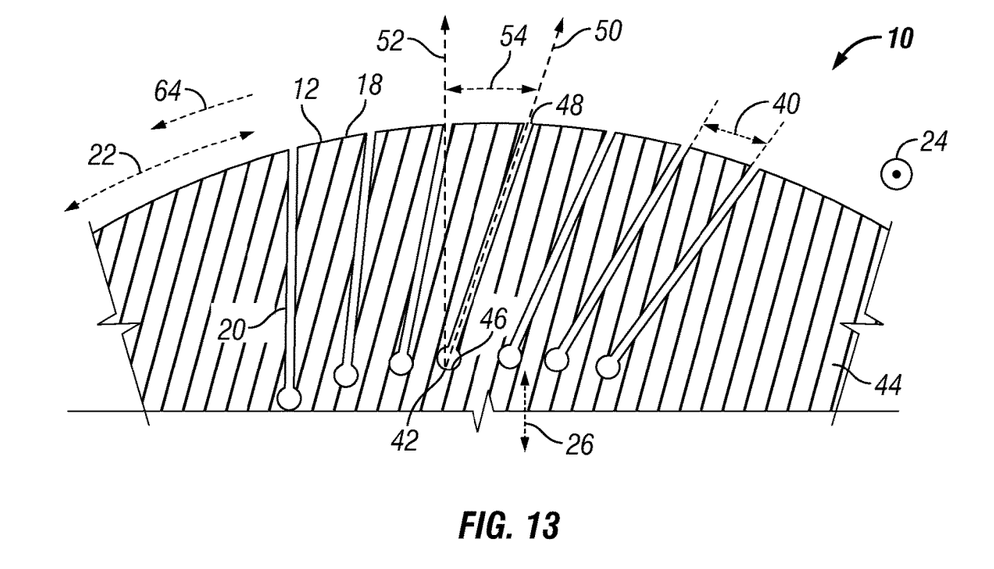
FIG. 13 is a cross-sectional view taken through a plane in the longitudinal direction of a portion of tread in accordance with another embodiment.

Although described as requiring at least one of the angled feature or the spacing feature, other embodiments of the present design include both of these features. FIG. 13 shows an alternate embodiment taken in cross-section through the shoulder rib 18 in reference plane 44 that is oriented in the longitudinal direction 22. The successive sipes 20 have a spacing 40 that is from 5-18 millimeters, and the sipes 20 are oriented so that the sipe inclination angle 54 is greater than 0 degrees. In the FIG. 13 embodiment the sipe inclination angle 54 is 20 degrees for all of the sipes 20. The sipes 20 can again extend the entire 360 degree circumference of the tire 10 in the longitudinal direction 22. The sipes 20 have a cross-sectional profile that is not undulated but is instead straight. Although the sipes 20 in the various embodiments have teardrops, other arrangements are possible in which the sipes 20 do not have teardrops.

Any number of the sipes 20 as described can be present in the tread 12. In some instances, all of the sipes 20 of the shoulder rib 18 are as described, and in other embodiments only some of the sipes 20 are as described. Further, although described as being in the shoulder rib 18, the sipes 20 as described may also additionally be in the center rib 66 and/or the intermediate rib 68. The measurements may be taken at the outer surfaces 58 of a new tire 10 or tread 12. The tread 12 may also have shallow depressions, markings or engravings in otherwise solid shoulder ribs 18. Such shallow features and are intended to wear out during the early wear life of the tread 12 and do not affect the stiffness of the ribs 18. The sipes 20 can have various features such as teardrops, edges with radii, and zig-zag shapes. Also, it is to be understood that as used herein that ranges, such as for example "from 10 to 50", or "between 10 and 50", include the values between the two numbers and also include the numbers themselves.

Although increasing the amount of sipes 20 in the shoulder rib 18 can lead to increased aggression damage, Applicants have discovered that the incorporation of one of the two features mentioned (angled sipes 10 relative to the thickness direction 26 and spacing 40) may limit or prevent aggression damage in the shoulder rib 18 while allowing for the benefits of sipes 20 to be realized. The shoulder rib 18 is a continuous rib 18 along the entire circumferential length of the tire 10 in the longitudinal direction 22 and does not include any grooves. Although sipes 20 are present in the shoulder rib 18, the sipes are 2 millimeters or less. The grooves have a width that is greater than 2 millimeters. The incorporation of grooves into the shoulder rib 18 would cause it to be composed of a series of blocks as the grooves would extend from the shoulder edge 14 to the shoulder groove 16. The present disclosure does not incorporate any grooves into the shoulder rib 18 so that it is not provided as a series of blocks but instead is a continuous rib 18 having sipes 20 therein.

Any type of tread material may be used with the presently disclosed tread 12 geometry. In some embodiments a low hysteresis tread material is used. Hysteresis can be measured by the tan(δ) value of the rubber making up the tread 12. The loss factor "tan(δ)" is a dynamic property of the rubber compound. It is measured on a viscosity analyzer (Metravib VA4000) according to Standard ASTM D5992-96. The response of a test specimen consisting of two cylindrical pellets each 2 mm thick and one centimeter in diameter is recorded (the test specimen is made from samples taken from a tire mid-way up the height of the zone concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 25% peak to peak (on the outbound cycle) then from 25% to 1% peak to peak (on the return cycle). The results that are used here are the loss factor tan(δ) and the complex dynamic shear modulus. The complex dynamic shear modulus is denoted "G*25" in reference to the 25% strain applied during the test. During the outbound cycle, the maximum value of tan δ that is observed is denoted "max tan(δ)". Embodiments of the tread 12 with the disclosed geometries may have a max tan(δ) that is from 0.07 to 0.13. In other arrangements, the max tan(δ) of the tread 12 material is approximately 0.13.

It will be apparent to those skilled in the art that various modifications and variations can be made in the present invention without departing from the scope or spirit of the invention. For instance, features illustrated or described as part of one embodiment, can be used with another embodiment to yield a still further embodiment. As already discussed above, a tread or tire according to the invention may also comprise tread halves that are notably different from one another as long as each tread half remains within the scope of the invention as limited by the claims. Thus, it is intended that the present invention covers such modifications and variations as they fall within the scope of the appended claims and their equivalents.

The invention claimed is:

1. A heavy truck tire tread having a longitudinal direction, a lateral direction and a thickness direction, said tread comprising:
- a shoulder edge;
- a shoulder groove;
- a shoulder rib defined between the shoulder edge and the shoulder groove, wherein the shoulder rib does not have any grooves;
- a plurality of sipes in the shoulder rib that extend from the shoulder edge to the shoulder groove and terminate at the shoulder groove, wherein the sipes are oriented in the shoulder rib so that either:
  - (A) an average sipe line drawn from the intersection of the sipe and the shoulder edge to the intersection of the sipe and the shoulder groove is at an average sipe line angle to the lateral direction that is less than 20 degrees, or
  - (B) an average sipe line drawn from a point of the sipe 8 millimeters inboard in the lateral direction from the shoulder edge to a point of the sipe 8 millimeters outboard in the lateral direction from the shoulder groove is at the average sipe line angle to the lateral direction that is less than 20 degrees;

wherein the plurality of sipes has spacing in the longitudinal direction between successive sipes that is 5 to 18 millimeters, and wherein the plurality of sipes is provided such that every fourth sipe in sequence in the longitudinal direction extends a greater distance into the tread in the thickness direction than does the previous three successive sipes such that the previous three successive sipes all extend the same distance into the tread in the thickness direction;

an intermediate rib next to the shoulder groove such that the shoulder groove is bound on opposite lateral sides by the intermediate rib and the shoulder rib, wherein intermediate rib sipes are present in the intermediate rib and are shaped differently than the plurality of sipes in the shoulder rib.

* * * * *